United States Patent [19]

Stansbury, Jr.

[11] 4,450,790
[45] May 29, 1984

[54] ANIMAL FEEDING APPARATUS

[75] Inventor: Benjamin H. Stansbury, Jr., Beverly Hills, Calif.

[73] Assignee: Adon Sanchez, Pomona, Calif.

[21] Appl. No.: 429,526

[22] Filed: Sep. 30, 1982

[51] Int. Cl.³ .............................................. A01K 5/02
[52] U.S. Cl. ................. 119/51.12; 119/51.5; 119/74
[58] Field of Search ............... 119/51.11, 51.12, 51.13, 119/51.5, 74; 222/650

[56] References Cited

U.S. PATENT DOCUMENTS

| 3,826,231 | 7/1974 | Crowford et al. | 119/51.12 |
| 4,069,793 | 1/1978 | Gower | 119/51.13 |
| 4,248,175 | 2/1981 | Navarro | 119/51.12 |

FOREIGN PATENT DOCUMENTS

| 1546638 | 5/1979 | United Kingdom | 119/51.12 |
| 2037140 | 7/1980 | United Kingdom | 119/51.11 |

Primary Examiner—Robert Peshock
Assistant Examiner—Kris R. Schulze
Attorney, Agent, or Firm—Boniard I. Brown

[57] ABSTRACT

Animal food dispensing apparatus is provided which includes a tray with a plurality of food receptacles therein, upper openings generally similar in configuration, and a cover positioned over the tray with an aperture generally like the receptacle openings in configuration and size. The cover is movable among a plurality of successive positions in each of which the cover aperture is in general registration with a receptacle opening, the cover being indexed among these positions by indexing apparatus. Apparatus is provided for selective delivery of liquid to the receptacles.

10 Claims, 7 Drawing Figures

U.S. Patent  May 29, 1984  Sheet 1 of 2  4,450,790
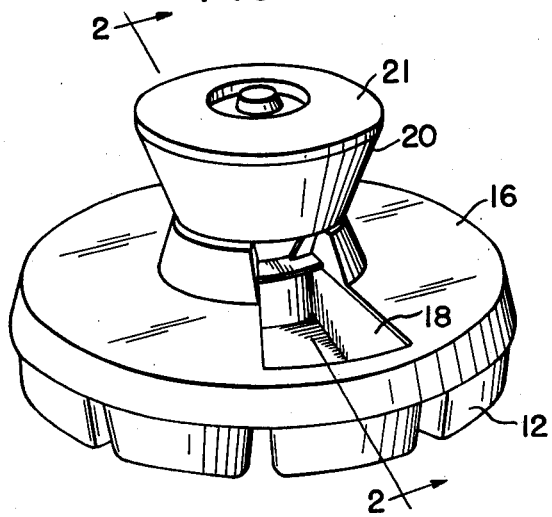
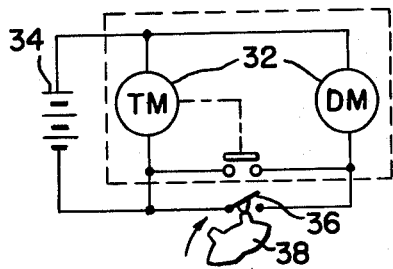
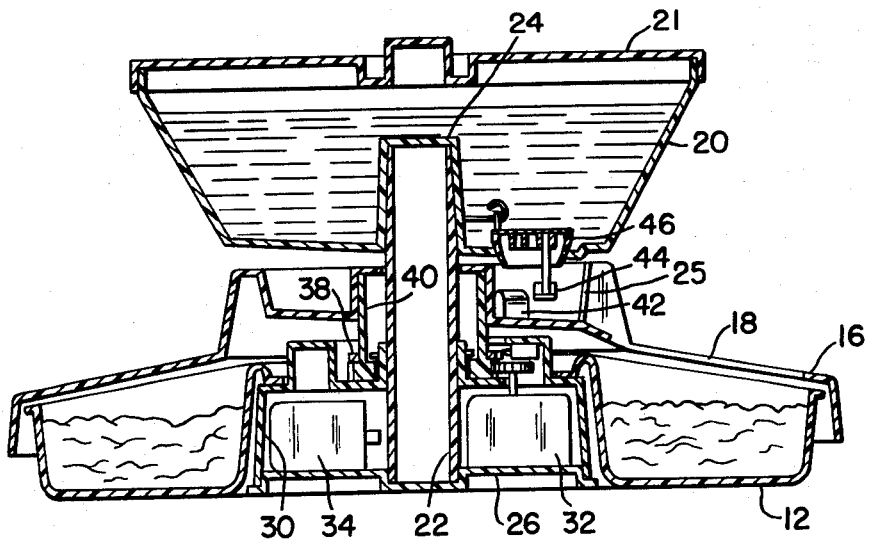

FIG-3
FIG-4
FIG-5
FIG-6
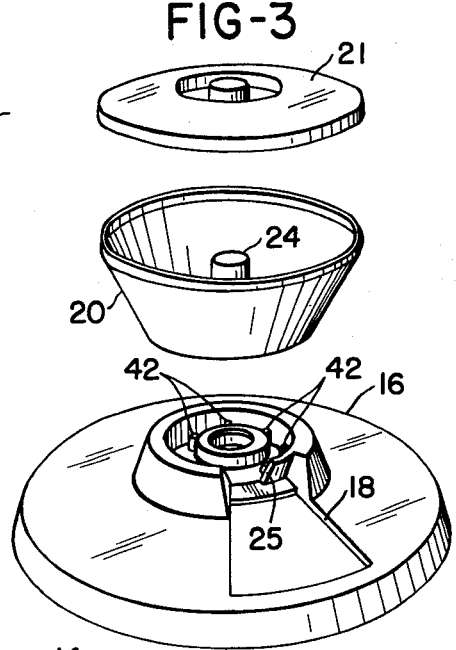
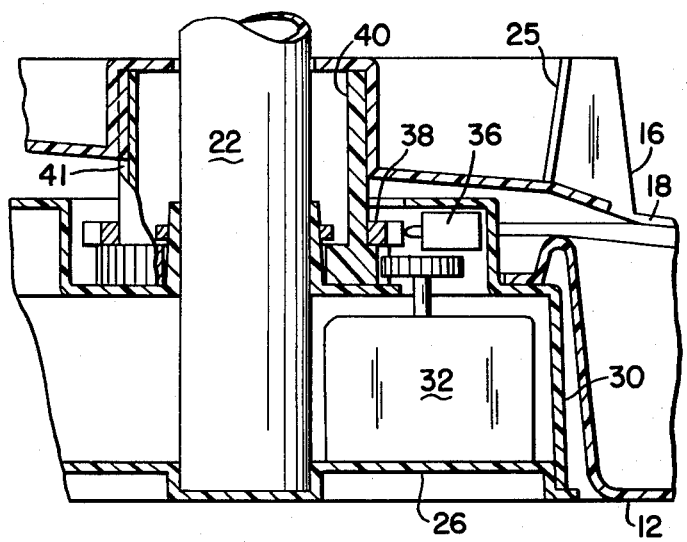
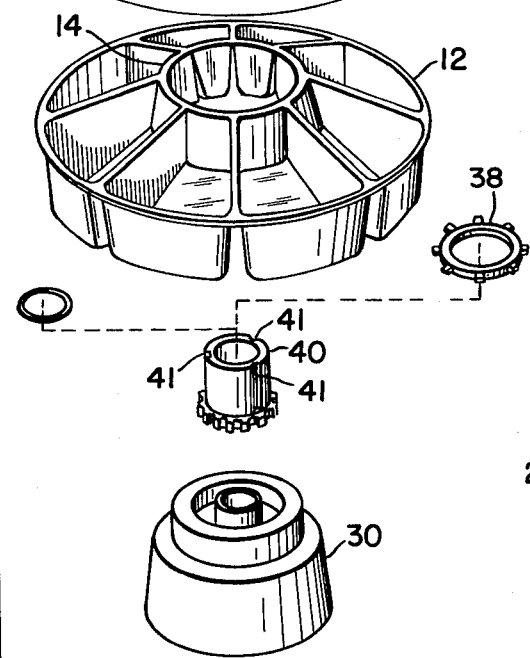
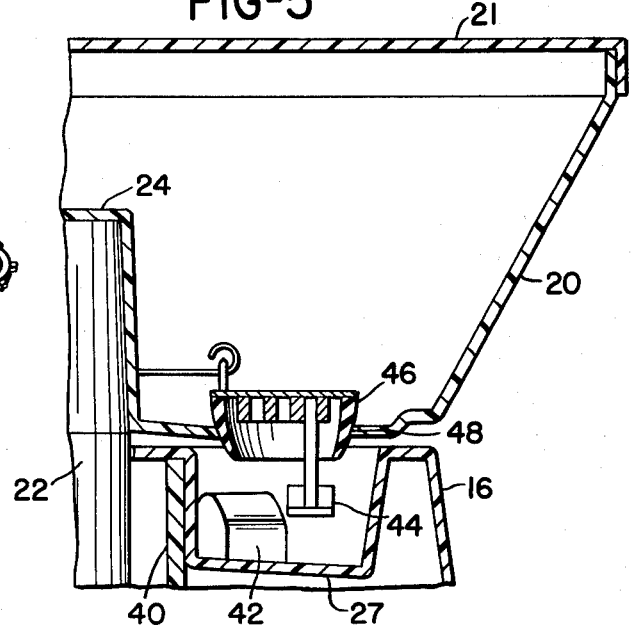
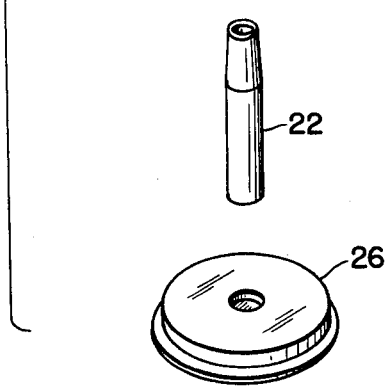
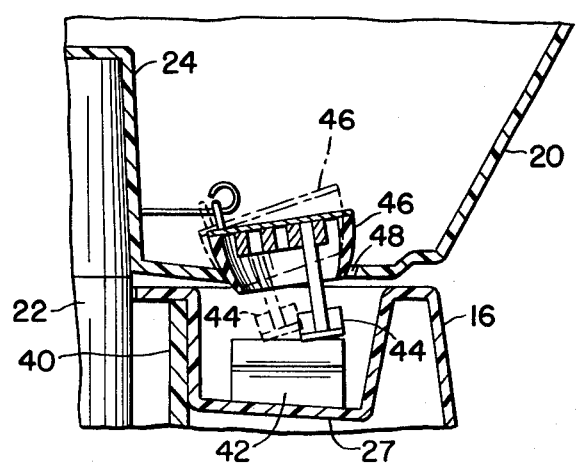

ANIMAL FEEDING APPARATUS

BACKGROUND OF THE INVENTION

The invention relates to animal feeding apparatus and particularly to apparatus for opening discrete food receptacles at predetermined times. Animal owners are often constrained in their travel plans and other activities by the feeding schedules of their pets. It is of great importance for many people to be able to vary their personal schedules without altering the feeding schedule for their animals. The use of a standardized feeding cycle, such as one feeding per day at a given time, is desirable because of the natural rhythm of the animal as well as the desirability of humane treatment of the animals.

The utilization of such feeders for dogs, for example, has the additional advantage of eliminating the requirement for a boarding kennel. The dog will be happier in a more familiar environment and may also function as a watchdog. Although the invention has primary application to the feeding of cats and dogs and other domestic animals, it will be understood that it also has application to feeding farm and other animals.

The prior art includes U.S. Pat. No. 2,528,742 which discloses a feeding apparatus in which a plurality of feeding stations are disposed in an arcuate array. A cover having an aperture therein is indexed periodically to registered relationships with each of the individual feeding stations. Such apparatus has not been wholly satisfactory because the apparatus described therein is not adapted to supply food other than dry food either because of the dangers of spoilage or at least an unappetizing foodstuff, if dry food is mixed with water and allowed to sit for extended periods of time. For example, the foodstuff may sit for seven days in some cases.

Many feeding devices of the prior art are difficult and inconvenient to clean.

It is therefore an object of the invention to provide an animal feeding apparatus to enable animal owners to free and vary their personal schedules, travel plans, etc., while providing for the periodic feeding of the animals and providing humane treatment in an environment familiar to the animals.

An object of the invention is the provision of such apparatus which provides dry storage of food and automatic mixing therewith with liquid at time of feeding.

An object of the invention is the provision of such apparatus with components and structural arrangement which enable quick and convenient disassembly for cleaning and servicing.

SUMMARY OF THE INVENTION

The foregoing objects and other objects and advantages which shall become apparent from the detailed description of the preferred embodiment are attained in an automatic animal food dispensing apparatus which includes a tray with a plurality of food receptacles therein, the receptacles having openings of generally similar configuration, and a cover positioned over the tray with an aperture configured and sized generally like the receptacle opening. The cover is movable by indexing means among a plurality of successive positions in each of which the cover aperture generally registers with one of the receptacle openings. The dispenser includes means for selective delivery of the quantity of liquid to the receptacles substantially concurrently with operation of the indexing means to position the cover aperture over a food receptacle in which liquid is delivered. The cover and tray may preferably be generally circular, and the plurality of cover positions be in circular array, with the openings having the general configurations of circular segments.

A reservoir is part of the liquid delivery arrangement and is preferably supported on a column which engages in a downwardly facing recess in the reservoir. The column is supported on a base member and the cover is supported on the base member for rotation about the column by a motor, and the tray rests unsecured on the base member. The components are thus readily and conveniently separable, without requiring any tool or skill, for cleaning and servicing, the reservoir, cover and tray each being separable merely by lifting for removal. Peripheral depending lips on the reservoir lid and on the cover serve to protect the contents of the reservoir and the food receptacles.

BRIEF DESCRIPTION OF THE ACCOMPANYING DRAWING

FIG. 1 is a perspective view of an animal feeding apparatus in accordance with the invention;

FIG. 2 is a sectional elevational view, taken at line 2—2 in FIG. 1;

FIG. 3 is an exploded perspective view of the animal feeding apparatus of FIGS. 1 and 2;

FIG. 4 is an enlarged partial sectional view;

FIGS. 5 and 6 are enlarged partial sectional views, illustrating the operational relationships of a cam and water valve utilized with the invention; and FIG. 7 is a simplified electrical schematic diagram.

DESCRIPTION OF THE PREFERRED EMBODIMENT

Referring now to FIGS. 1-6, there is shown a feeding apparatus 10 in accordance with the invention. The feeding apparatus 10 includes a feeding dish tray 12 which, in the preferred embodiment, has eight discrete feeding dishes or receptacles disposed in radially symmetrical relationship about a central or axial opening 14. A cover member 16 is rotatably mounted above the tray 12 and defines an aperture 18 which is generally sized and configurated like the respective openings of the receptacles of tray 12.

A reservoir 20 for containing a liquid, such as water, is supported by its cup-shaped recess 24 engaging and seating atop a shaft or column 22 which is supported in a recess in a base element 26. A lid 21 fits atop the reservoir and has a depending peripheral lip to protect the interior contents and to retain the lid in position. A base 30 is supported on a peripheral flange of support element 26 and has a central portion which engages about the column or post 22. Base 30 provides a housing for an indexing motor and timing motor 32, which preferably are a single unit, and a battery 34, which serves as a power source in applications where external power connections are not utilized. Indexing cam ring 38 is mounted on a gear member 40 which is supported on base 30 and is driven by indexing motor 32. The drive gear of the indexing motor engages a peripheral gear formed integrally with gear member 40, as indicated in FIGS. 3 and 4, the gear member 40 being secured for rotation with cover 16 about column 22.

As shown in FIGS. 2 and 3, reservoir 20 is supported atop column 22 by engagement of its recessed cup portion 24 therewith. Cover 16 is supported atop gear member 40, and keyways 41 (FIGS. 3 and 4) of the gear member engage mating keys in the cover (FIG. 4). The keying between the cover and the gear member provide means for insuring correct rotational positioning of the cover opening 18 with the tray receptacles, upon removal and replacement of the cover, as on the occasion of cleaning, etc.

The receptacle tray 12 is supported on a shoulder of base 30, as shown, and upon the supporting surface or ground.

It will therefore be appreciated that these components are readily separable and removable by merely lifting and removing them in succession, there being no fastener involved and no tools or any particular knowledge required. Thus, cleaning and servicing can be accomplished with efficiency and thoroughness, with a minimum of time and inconvenience. Thus, the reservoir 20 can be lifted from the post 22, the cover 16 can then be lifted from its supporting gear member 40, and the receptacle tray 12 is then accessible for cleaning and/or may be removed by lifting it from the base 30.

The timing motor, actuated by appropriate timing means, triggers the indexing motor to rotate the cover ⅛th of a revolution at the end of a predetermined time period, such as 24-hours. The indexing motor drives the gear 40 and cover 16 rotationally about the column 22. Seven cams 42 are disposed on cover 16 (one only shown), and are disposed at seven of eight equally angularly spaced stations about the geometric center of cover 16. Each cam 42 cooperates with a stem 44 of valve 46, fabricated of rubber or appropriate plastic material. Rotation of cover 16 causes a cam 42 to engage stem 44, thus pivoting or tilting valve 46 from its closed position of FIG. 5 to an open position, such as that shown in FIG. 6, wherein valve 46 is separated and spaced from valve seat 48, thus to allow flow of water or other liquid from reservoir 20 into the angular catch basin 27 in cover 16 from which it passes via gap or opening 25 into the particular receptacle in tray 12 exposed by aperture 18. As indicated in FIG. 6, the spacing between seat 48 and valve 46 when open is governed by positioning stem 44 in a selected one of the recesses shown in valve 46. The proportions of each cam 42 are selected to meter the same amount of liquid to each food receptacle.

In each of the successive rotational positions of cover 16, its aperture 18 is disposed in generally registering relationship with one of the feed receptacles in tray 12. In the preferred embodiment illustrated, tray 12 is provided with eight discrete feed receptacles, intended to provide respective storage spaces for food for each of seven days or other time periods. An eighth position is provided in order that the aperture 18 may initially be registered with an empty feed receptacle, and may thereafter be successively indexed to receptacles containing food at the selected time intervals.

In other embodiments of the invention, indexing of cover 16 may be accomplished mechanically. For example, rotary motion of a cover may be provided by utlizing any of various mechanical linkages, such as a Geneva Lock.

It will be understood that various electrical arrangements are practical. For example, the arrangement described in U.S. Pat. No. 3,900,007 might be used to control the timing and indexing motors to provide the necessary indexing of the cover 16.

The invention has been described with reference to its illustrated preferred embodiment. Persons skilled in the art may, upon exposure to the teachings herein, conceive variations in the mechanical development of the components therein. Such variations are deemed to be encompassed by the disclosure, the invention being delimited only by the appended claims.

The Inventor claims:

1. An automatic animal food dispenser comprising:
   tray means having a plurality of food receptacles therein with upper openings of generally similar configurations;
   a cover positioned over said tray and defining an aperture sized and configured generally like said configuration of said receptacle openings, said cover being movable among a plurality of successive positions, in each of which positions said cover aperture is generally registered with one of said receptacle openings;
   means for indexing said cover among said plurality of positions; and
   means for selective delivery of a quantity of liquid to said receptacles including a reservoir having valve means, a support for holding said reservoir above said cover, and mechanical actuation means for releasing said quantity of liquid responsive to movement of said cover, said mechanical actuation means including valve actuating means attached to said cover for actuating said valve means.

2. Dispensing apparatus according to claim 1, wherein:
   said liquid delivering means is actuated substantially concurrently with operation of said indexing means.

3. Dispensing apparatus according to claim 2, wherein:
   said cover and said tray are generally circular in configuration.

4. Dispensing apparatus according to claim 2, wherein:
   said plurality of positions are in a generally circular array, and said openings have the general configurations of circular sections.

5. Dispensing apparatus according to claim 3, wherein:
   said plurality of positions are in a generally circular array, and said openings have the general configurations of circular sections.

6. An automatic animal food dispenser according to claim 1, further including:
   base means;
   said cover being supported for rotation relative to the base means, and said tray resting on said base means;
   said reservoir, said cover and said tray being separable for cleaning and servicing.

7. Dispensing apparatus according to claim 6, wherein:
   said plurality of positions are in a generally circular array, and said openings have the general configurations of circular sections.

8. An automatic animal dispenser according to claim 7, and further including:
   said support comprising a column supported on said base means;
   said reservoir defining a downwardly facing recess, said column engaging said recess to support the reservoir above the cover;
   said base means comprising a base member housing a drive motor;

said cover being supported on said base member for rotation by said motor about said column; and said tray resting unsecured on said base member.

9. An automatic animal food dispenser according to claim 7, and further including:

a lid cooperating with said reservoir, a peripheral depending lip portion on said lid protecting the reservoir contents and retaining said lid in position; and a peripheral depending lip portion of said cover extending downwardly about the periphery of said tray to protect the contents of the food receptacles.

10. An automatic animal food dispenser according to claim 8, and further including:

a lid cooperating with said reservoir, said lid having a peripheral depending lip portion protecting the contents of said reservoir and retaining said lid in position; and said cover having a peripheral depending lip portion extending downwardly about the periphery of said tray to protect the contents of the food receptacles.

* * * * *